United States Patent
Maruyama

(10) Patent No.: US 8,615,352 B2
(45) Date of Patent: Dec. 24, 2013

(54) DRIVING SUPPORT APPARATUS FOR VEHICLE

(75) Inventor: Tasuku Maruyama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 230 days.

(21) Appl. No.: 13/070,800

(22) Filed: Mar. 24, 2011

(65) Prior Publication Data

US 2011/0246043 A1    Oct. 6, 2011

(30) Foreign Application Priority Data

Mar. 30, 2010  (JP) ................................ 2010-079032
Mar. 30, 2010  (JP) ................................ 2010-079033

(51) Int. Cl.
*G05D 1/00*    (2006.01)

(52) U.S. Cl.
USPC .............................................. 701/96; 701/93

(58) Field of Classification Search
None
See application file for complete search history.

(56) References Cited

U.S. PATENT DOCUMENTS

| 7,477,979 B2 | 1/2009 | Arai et al. |
| 2005/0216168 A1* | 9/2005 | Arai et al. ........................ 701/96 |
| 2006/0149455 A1 | 7/2006 | Sawada |

FOREIGN PATENT DOCUMENTS

JP    2005-247197    9/2005

\* cited by examiner

*Primary Examiner* — Thomas Tarcza
*Assistant Examiner* — Garrett Evans
(74) *Attorney, Agent, or Firm* — Smith, Gambrell & Russell, LLP

(57) ABSTRACT

A cruise control unit, configured to permit starting when an inter-vehicle distance to a front vehicle exceeds a determination threshold before a preset amount of time passes from a driver's operational input during a stopped state, calculates a first threshold that is updated to be larger according to a change in the inter-vehicle distance in the stopped state when the distance changes to be larger and a second threshold that is changed to be larger as a speed of the front vehicle is higher, and variably sets the determination threshold based on the larger of the two thresholds. It cancels the permission if a time passing from the operational input is determined longer than a cancel determination time for determining whether it is immediately after the driver's operational input and if the front vehicle is determined to stop or substantially stop at a speed lower than a preset vehicle speed.

4 Claims, 9 Drawing Sheets

FIG. 8

| INTER-VEHICLE DISTANCE | L < Dth | | L ≧ Dth | |
|---|---|---|---|---|
| FRONT VEHICLE SPEED | Vf < Vth | Vf ≧ Vth | Vf < Vth | Vf ≧ Vth |
| t = 0.0～0.7 | × | × | ○ | ○ |
| t = 0.7～3.0 | × | × | ○ → × | ○ |

DRIVING SUPPORT APPARATUS FOR VEHICLE

CROSS-REFERENCE TO RELATED APPLICATIONS

The present application claims priority from Japanese Patent Application Nos. 2010-079032 and 2010-079033 filed on Mar. 30, 2010, the entire contents of which are hereby incorporated by reference.

BACKGROUND OF THE INVENTION

1. Field of the Invention

The present invention relates to a vehicle driving support apparatus that executes a follow-up cruise control or the like to follow a vehicle recognized in front of a subject vehicle.

2. Description of the Related Art

There have conventionally been various proposals for vehicle driving support apparatuses configured to recognize out-of-vehicle information in front of a vehicle by using onboard radar devices such as a millimeter wave radar and an infrared laser radar, imaging devices such as a stereo camera and a monocular camera, or a combination of the radar devices and the imaging devices, and execute various controls for the vehicle based on the recognized out-of-vehicle information. As an example of functions of such a driving support apparatus, a function of a follow-up cruise control to follow a vehicle in front when such a vehicle is detected (captured) in front of a subject vehicle is known widely.

The follow-up cruise control has been in practical use as part of an adaptive cruise control (ACC). In a typical use of the ACC, when the speed of the subject vehicle is in a high-speed range of a predetermined speed or higher (for example, a range of 40 km/h or higher), the follow-up cruise control is executed if a vehicle in front is detected, and a constant speed cruise control at a preset speed determined by the driver is executed if no vehicle in front is detected (or a vehicle in front is lost).

On the other hand, it has been a recent trend that the range to which the follow-up cruise control is applied is extended to a very low speed. Further, there have been proposed a technique of stopping the subject vehicle while maintaining a predetermined inter-vehicle distance from a vehicle in front when the vehicle in front has stopped (follow-up stop control) and a technique of starting the subject vehicle following a vehicle in front when the vehicle in front is detected to be started in a stop maintaining state after a follow-up stop.

In such a driving support apparatus, starting of the subject vehicle from a stopped state is typically permitted on the condition that the driver has made a predetermined operational input with a clear intention from the viewpoint of ensuring safety. For example, Japanese Unexamined Patent Application Publication (JP-A) No. 2005-247197 discloses a technique of permitting switching to a follow-up cruise control if the inter-vehicle distance between the subject vehicle and a vehicle in front is equal to or longer than a minimum target stopping distance and the vehicle in front has started during a preset amount of time (two seconds, for example) since a starting switch or a stopping switch was pressed by the driver in a stop maintaining state after a follow-up stop. In addition, JP-A No. 2005-247197 discloses a technique of advancing a vehicle by a predetermined distance (0.5 m, for example) if the inter-vehicle distance between the subject vehicle and a vehicle in front is equal to or longer than the minimum target stopping distance even if the vehicle in front is not started when the starting switch or the stopping switch was pressed by the driver.

However, the techniques disclosed in JP-A No. 2005-247197 as described above may cause the subject vehicle to be advanced at a timing that is not intended by the driver if a pedestrian or the like passes between the subject vehicle in a stop maintaining state and the vehicle in front, for example, because whether or not starting of the subject vehicle from a stopped state is to be permitted is determined basically based on the speed of the vehicle in front. Thus, if a pedestrian or the like passes between the subject vehicle in the stop maintaining state and a vehicle in front, for example, the distance from the subject vehicle to the pedestrian or the like may be temporarily recognized incorrectly as the inter-vehicle distance. In such case, the apparent inter-vehicle distance detected by the driving support apparatus changes in a manner that it becomes temporarily shorter and then immediately returns to the previous distance. When the apparent inter-vehicle distance suddenly changes in this manner, it may be recognized incorrectly that the vehicle in front has suddenly started, the subject vehicle may thus be started unintentionally even though the vehicle in front is in the stopped state, and then the follow-up stop control may begin immediately thereafter in the control process, which may give the driver an uncomfortable feeling.

Moreover, in such a driving support apparatus, the inter-vehicle distance between the subject vehicle and the vehicle in front that is detected by a radar device, an imaging device or the like may vary within a given error range due to various external factors or the like.

Therefore, according to the techniques disclosed in JP-A No. 2005-247197, if the starting switch or the stopping switch is pressed by the driver under the circumstances that the subject vehicle is maintained in the stopped state with an inter-vehicle distance to a vehicle in front slightly shorter than the minimum target stopping distance, the subject vehicle may be advanced at a timing that is not intended by the driver. Specifically, an inter-vehicle distance that is longer than the minimum target stopping distance may be temporarily detected due to detection errors of the inter-vehicle distance or the like at a point when a predetermined amount of time has passed since the starting switch or the stopping switch was pressed by the driver (at a point when approximately two seconds have passed since the switch was pressed, for example) under the circumstances that the subject vehicle is maintained in the stopped state with the inter-vehicle distance slightly shorter than the minimum target stopping distance. In such case, the subject vehicle may be started to advance even though the vehicle in front is in the stopped state, which may give the driver an uncomfortable feeling.

SUMMARY OF THE INVENTION

The present invention has been made in view of the above circumstances and aims to provide a driving support apparatus for a vehicle capable of realizing starting of a subject vehicle from a stopped state without causing any uncomfortable feeling.

The present invention aims to provide a driving support apparatus for a vehicle capable of realizing driving support without causing any uncomfortable feeling by properly preventing a subject vehicle from being advanced at an unintended timing when the vehicle is in a stopped state.

A driving support apparatus for a vehicle according to an aspect of the present invention includes: a front vehicle detector configured to detect a vehicle in front on a subject vehicle travel path; an automatic follow-up controller capable of selectively executing as an automatic follow-up control, when the vehicle in front is detected, any of controls including a follow-up cruise control controlling the subject vehicle to follow the vehicle in front that is traveling, a follow-up stop control controlling the subject vehicle to stop as the vehicle in front that stops during the follow-up cruise control, and a stop maintaining control maintaining a stopped state of the subject vehicle that has stopped as a result of the follow-up stop control; a starting permission determiner configured to permit starting of the subject vehicle from a stopped state when a preset operational input is made by a driver during the stop maintaining control and an inter-vehicle distance to the vehicle in front exceeds a determination threshold before a preset amount of time passes from the operational input; and a threshold setter configured to calculate a first threshold that is updated to a larger value according to a change in the inter-vehicle distance to the vehicle in front in a stopped state when the inter-vehicle distance changes to a larger value and a second threshold that is changed to a larger value as a speed of the vehicle in front increases, and to variably set the determination threshold based on the larger of the first threshold and the second threshold.

A driving support apparatus for a vehicle according to another aspect of the present invention includes: a front vehicle detector configured to detect a vehicle in front on a subject vehicle travel path; an automatic follow-up controller capable of selectively executing as an automatic follow-up control, when the vehicle in front is detected, any of controls including a follow-up cruise control controlling the subject vehicle to follow the vehicle in front that is traveling, a follow-up stop control controlling the subject vehicle to stop as the vehicle in front that stops during the follow-up cruise control, and a stop maintaining control maintaining a stopped state of the subject vehicle that has stopped as a result of the follow-up stop control; a starting permission determiner configured to determine starting permission of the subject vehicle from a stopped state when a preset operational input is made by a driver during the stop maintaining control and an inter-vehicle distance to the vehicle in front exceeds a determination threshold before a preset amount of time passes from the operational input; and a canceller configured to cancel the starting permission if a time that has passed from the operational input is determined to be shorter than the preset amount of time and longer than a cancel determination time for determining whether or not it is immediately after the operational input by the driver and if the vehicle in front is determined to be in a stopped state or in a substantially stopped state at a speed lower than a preset vehicle speed.

According to the driving support apparatus for a vehicle of the present invention, it is possible to realize starting of a subject vehicle from a stopped state without causing any uncomfortable feeling.

According to the driving support apparatus for a vehicle of the present invention, it is possible to realize driving support without causing any uncomfortable feeling by properly preventing a subject vehicle from being advanced at an unintended timing when the vehicle is in a stopped state.

BRIEF DESCRIPTION OF THE DRAWINGS

FIG. 8 is a table showing conditions under which follow-up starting is permitted;

DETAILED DESCRIPTION OF THE PREFERRED EMBODIMENTS

Figure 2:
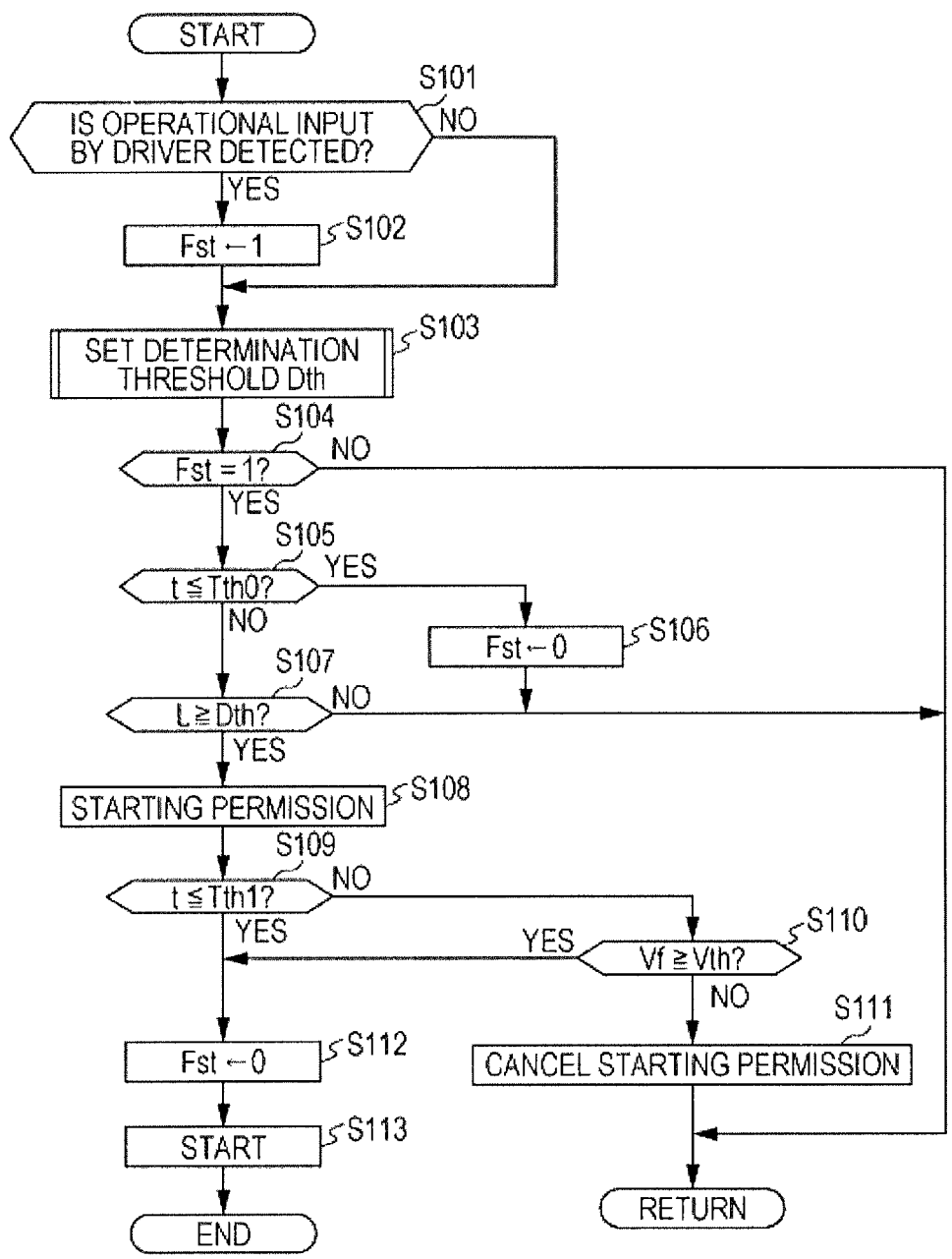
FIG. 2 is a flowchart of a routine for determining permissibility of follow-up starting.
Figure 3:
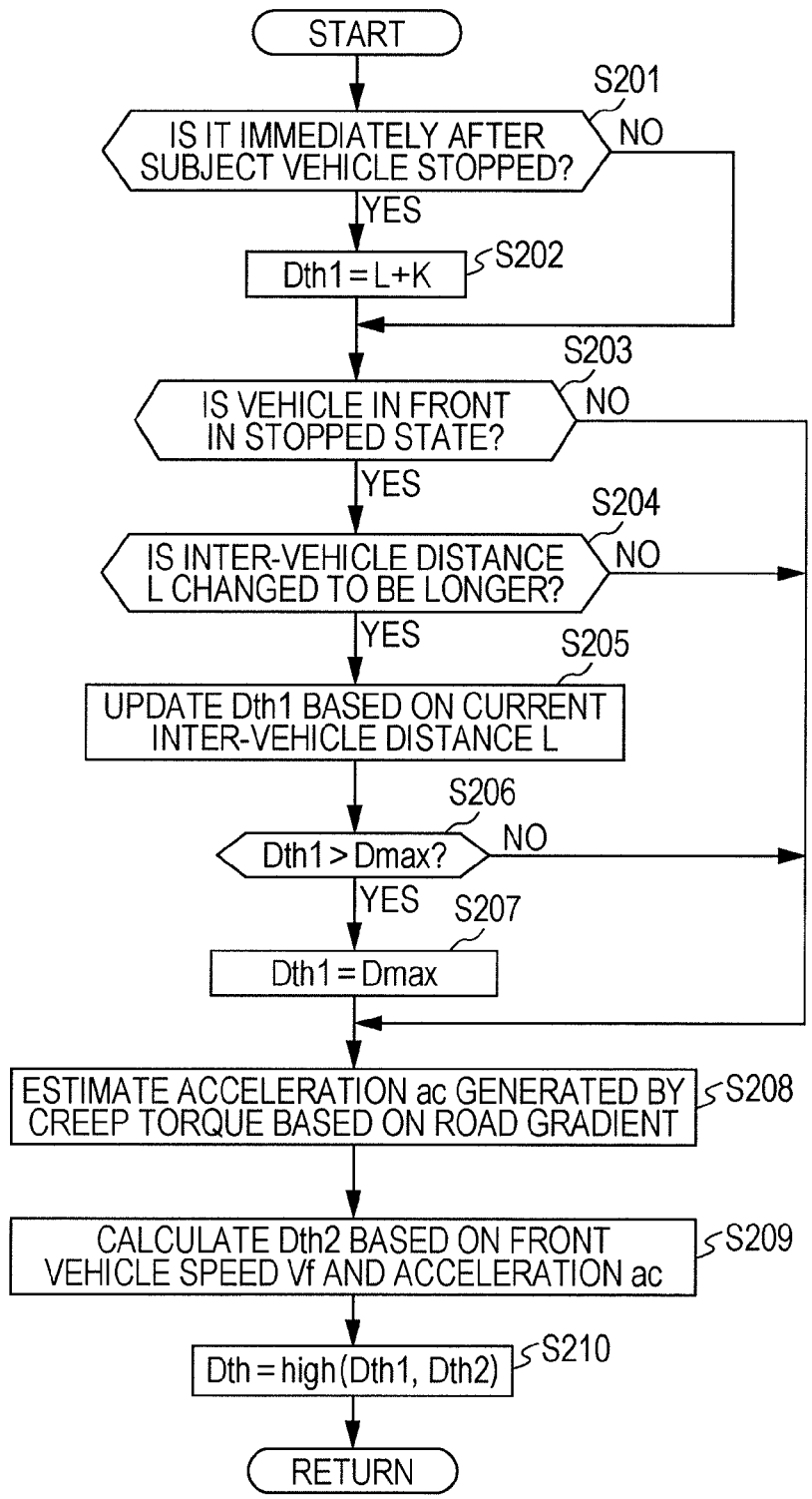
FIG. 3 is a flowchart of a sub-routine for setting a determination threshold.
Figure 4:
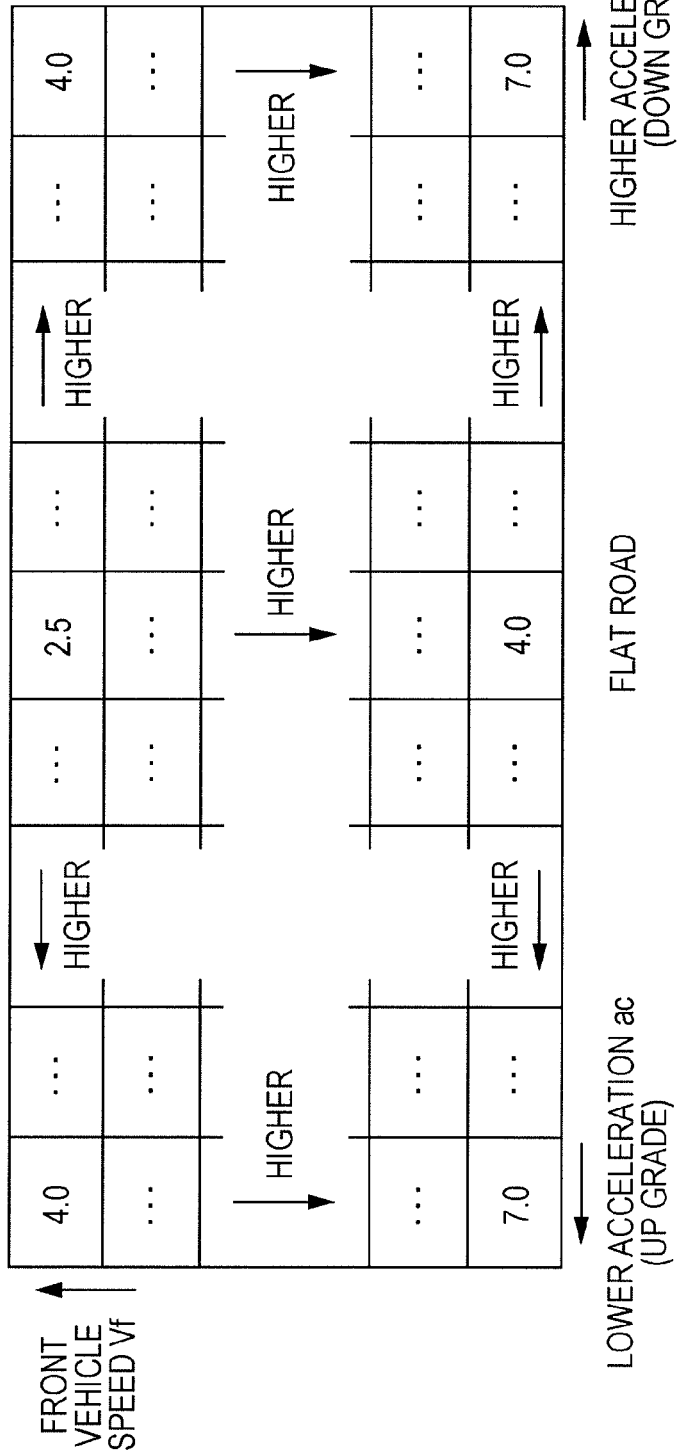
FIG. 4 is a map showing a relationship of the gradient of roads and the speed of a vehicle in front with a second threshold.
Figure 5C:
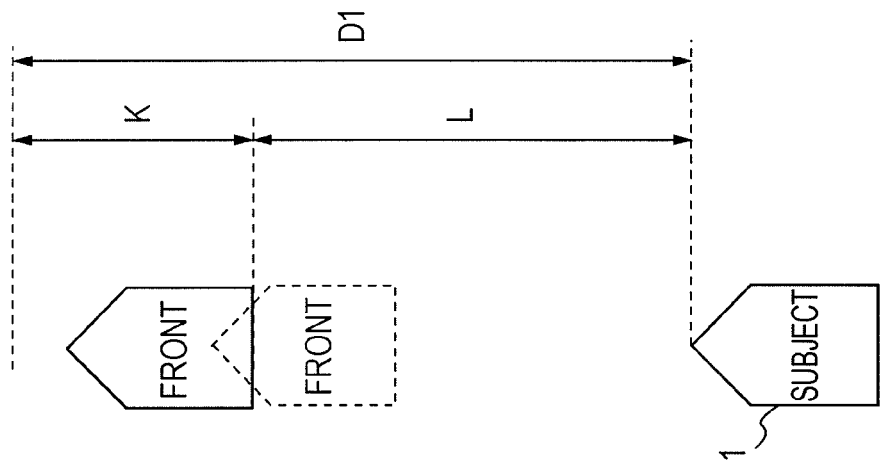
FIGS. 5A to 5C are diagrams for explaining a first threshold.
Figure 5B:
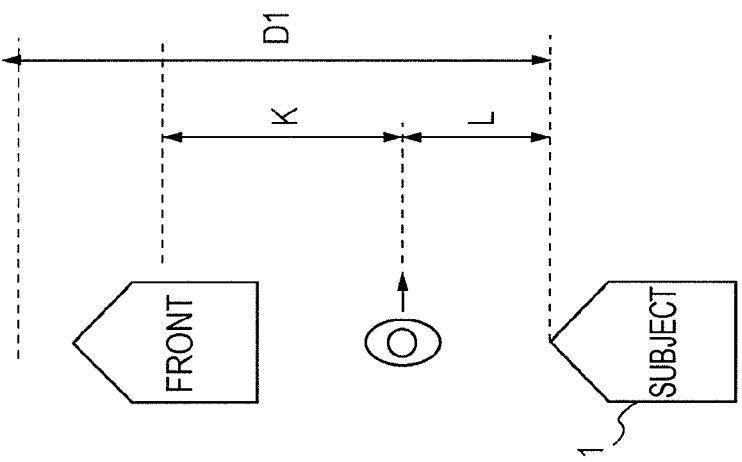
Figure 5A:
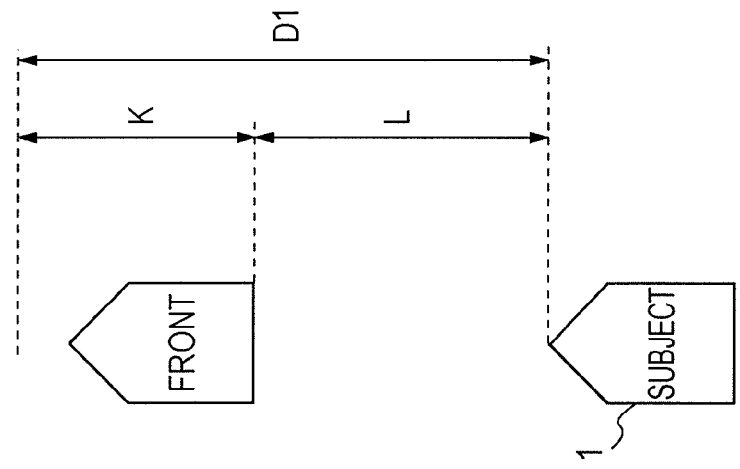
Figure 6A:
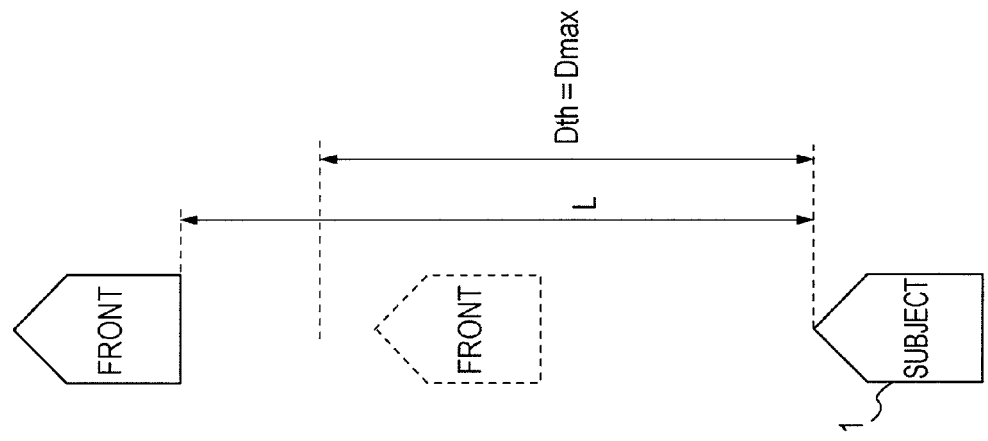
FIGS. 6A to 6C are explanatory diagrams showing the relationship between a determination threshold and the position of a vehicle in front.
Figure 6B:
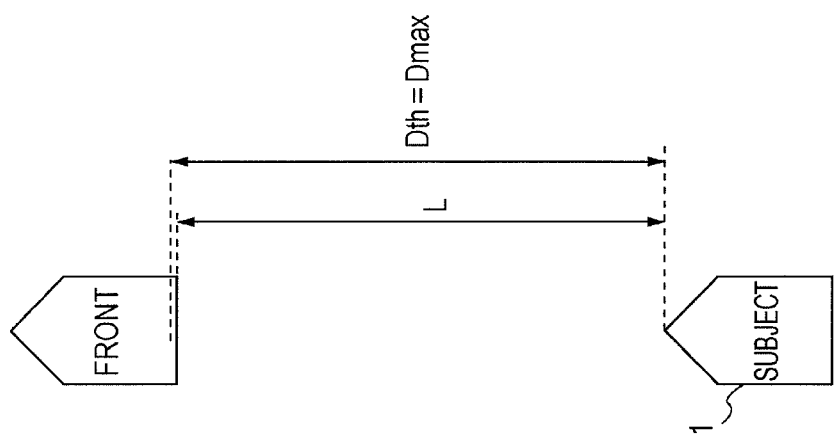
Figure 6C:
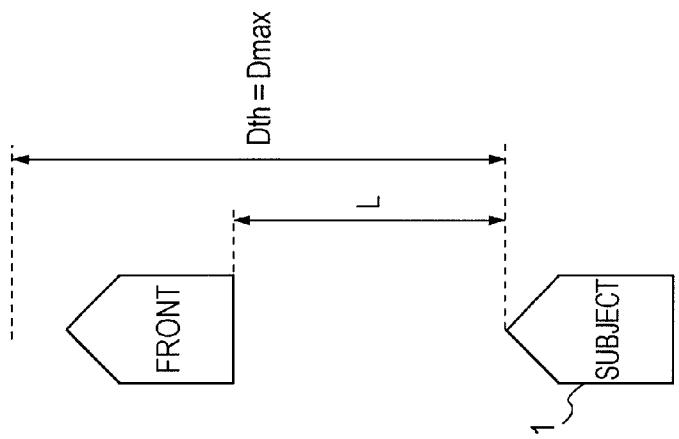
Figure 7A:
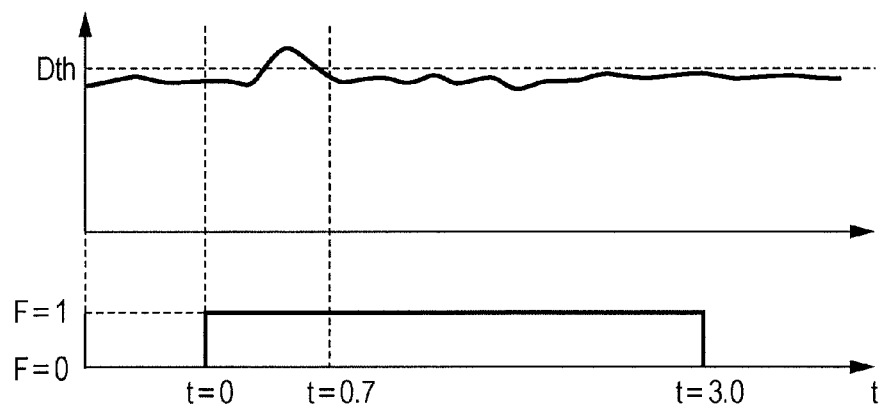
FIGS. 7A and 7B are graphs for explaining determination of whether or not to cancel follow-up starting.
Figure 7B:
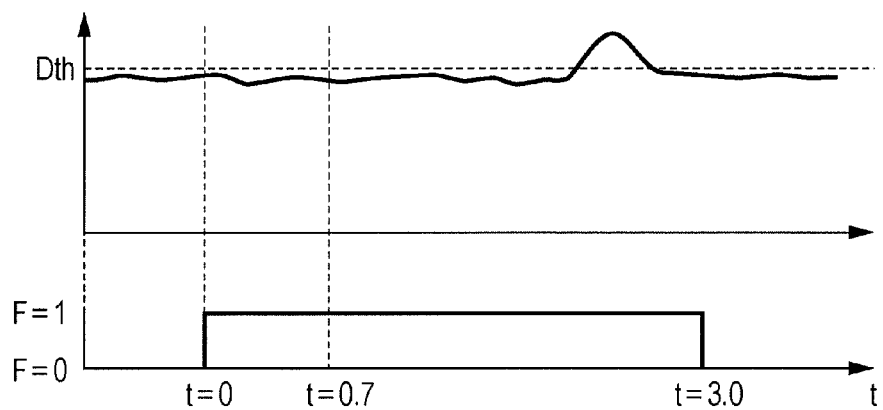
Figure 9:
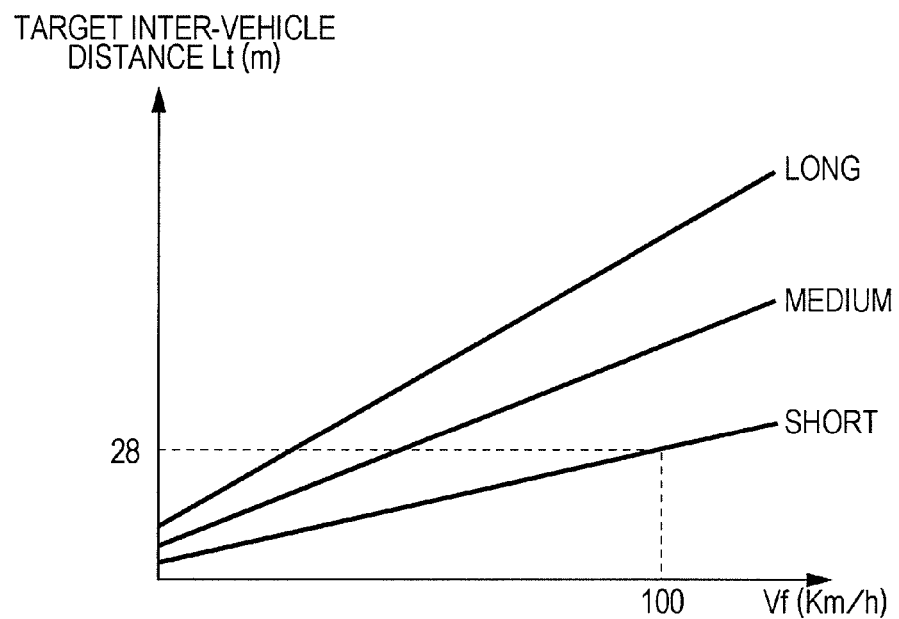
FIG. 9 is a characteristic graph showing the relationship between the speed of a vehicle in front and a target inter-vehicle distance.
Figure 10:
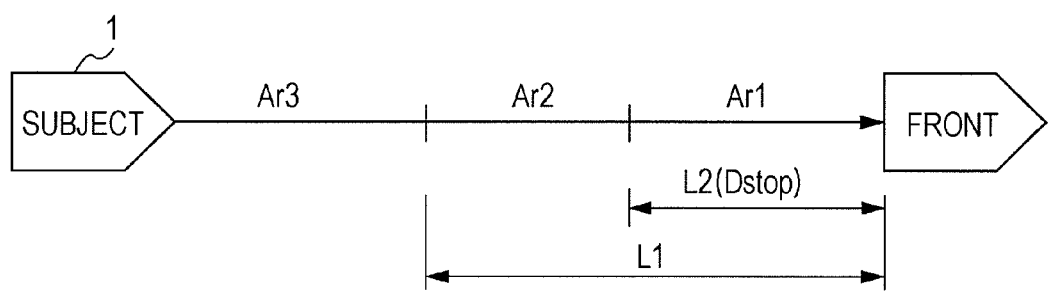
FIG. 10 is a diagram for explaining areas set in a follow-up stop control.

An embodiment of the present invention will be described below with reference to the drawings. The drawings relate to an embodiment of the present invention, in which FIG. 1 is a schematic configuration diagram of a driving support apparatus mounted on a vehicle, FIG. 2 is a flowchart of a routine for determining permissibility of follow-up starting, FIG. 3 is a flowchart of a sub-routine for setting a threshold for determination, FIG. 4 is a map showing a relationship of the gradient of roads and the speed of a vehicle in front with a second threshold, FIGS. 5A to 5C are diagrams for explaining a first threshold, FIGS. 6A to 6C are explanatory diagrams showing the relationship between a determination threshold and the position of a vehicle in front, FIGS. 7A and 7B are graphs for explaining determination of whether or not to cancel follow-up starting, FIG. 8 is a table showing conditions under which follow-up starting is permitted, FIG. 9 is a characteristic graph showing the relationship between the speed of a vehicle in front and a target inter-vehicle distance, and FIG. 10 is a diagram for explaining areas set in a follow-up stop control.

Figure 1:
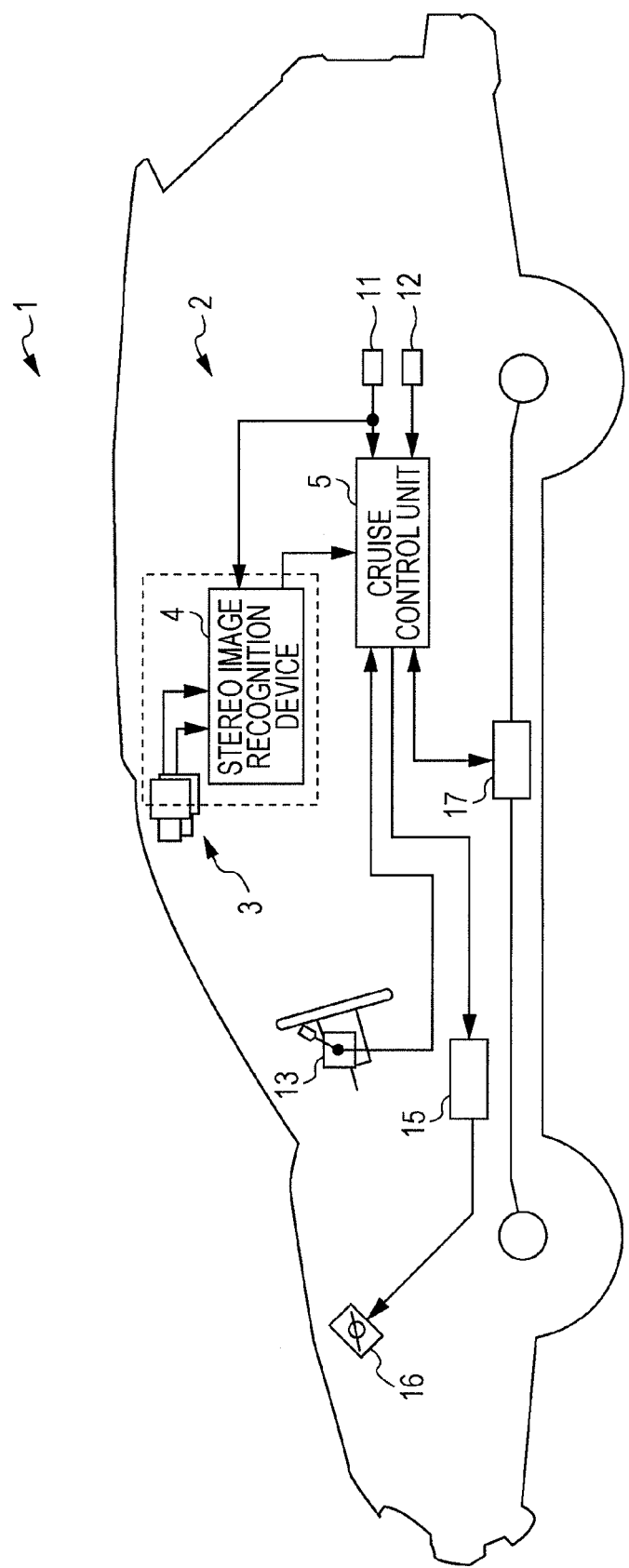
FIG. 1 is a schematic configuration diagram of a driving support apparatus mounted on a vehicle.

In FIG. 1, a vehicle (a subject vehicle) such as a car, represented by reference numeral 1, has an adaptive cruise control (ACC) system 2 as an example of a driving support apparatus mounted therein.

The ACC system 2 includes a stereo camera 3, a stereo image recognition device 4, and a cruise control unit 5 constituting a main part thereof. The ACC system 2 basically executes a constant speed cruise control that maintains a speed set by the driver when no vehicle in front is present or an automatic follow-up control to follow a vehicle in front when such a vehicle in front is present.

The stereo camera 3 includes a set of CCD cameras using solid state imaging devices such as charge-coupled devices (CCDs), for example, as a stereo optical system. The right and left CCD cameras are attached on front portions of a ceiling of a passenger compartment with a predetermined distance therebetween, and capture images of external subjects in stereo from different points of view. In the following description, one (a right image, for example) of images captured in stereo is referred to as a reference image while the other image (a left image, for example) is referred to as a comparison image.

Stereo image data captured by the stereo camera 3, the speed Vo of the subject vehicle detected by a vehicle speed sensor 11 and the like are input to the stereo image recognition device 4.

The stereo image recognition device 4 first divides the reference image into small regions such as 4×4 pixels, compares the luminance or the color pattern of each small region with that of the comparison image to find a region in the comparison image corresponding thereto and obtain the distance distribution over the entire reference image. The stereo image recognition device 4 also checks the luminance difference between adjacent pixels for each pixel on the reference image, extracts pixels having luminance differences larger than a threshold as edges, and adds distance information to the extracted pixels (edges) to generate a distribution image (distance image) of the edges having the distance information. The stereo image recognition device 4 further recognizes a white line, a side wall, a three-dimensional object and the like in front of the subject vehicle based on the generated distance image, assigns different IDs to the respective recognized data, and monitors them continuously in frames for each ID. The stereo image recognition device 4 estimates a travel path (a subject vehicle travel path) in front of the subject vehicle 1 based on the monitoring results, and detects a vehicle in front on the subject vehicle travel path. If a vehicle in front is present, the stereo image recognition device 4 recognizes various information data on the vehicle in front such as the distance to the vehicle in front (the inter-vehicle distance) L, the speed of the vehicle in front ((the rate of change of the inter-vehicle distance L)+(the speed Vo of the subject vehicle)) Vf, and the deceleration of the vehicle in front (a differential value of the speed Vf of the vehicle in front) af. In this manner, the stereo image recognition device 4 together with the stereo camera 3 implement functions as a front vehicle detector in the present embodiment.

The recognized information from the stereo image recognition device 4, the speed Vo of the subject vehicle detected by the vehicle speed sensor 11, the longitudinal acceleration ao detected by a longitudinal acceleration sensor 12, an operational input signal input to a constant speed cruise switch 13 by a driver and the like are input to the cruise control unit 5. The constant speed cruise switch 13 is constituted, for example, by a plurality of switches connected to a constant speed cruise control lever provided at a side portion of a steering column. Specifically, the constant speed cruise switch 13 includes a vehicle speed setting switch for setting a target vehicle speed at the constant speed cruise, a coast switch for mainly changing the target vehicle speed to a lower value, a resume switch for mainly changing the target vehicle speed to a higher value, and the like. Further, a main switch (not shown) for switching ON and OFF the constant speed cruise control and the automatic follow-up control is arranged near the constant speed control lever.

When the main switch is switched ON by an operational input to the constant speed cruise switch 13 by the driver and a desired vehicle speed is set, the cruise control unit 5 executes a feedback control of the opening degree of a throttle valve 16 by supplying a signal to a throttle valve controller 15 so that the vehicle speed Vo detected by the vehicle speed sensor 11 becomes the set vehicle speed set by the driver, or activates an automatic brake by supplying a deceleration signal to an automatic brake controller 17.

If a vehicle in front is recognized by the stereo image recognition device 4 while the cruise control unit 5 executes the constant speed cruise control, the cruise control unit 5 switches the cruise control to the automatic follow-up control to follow the vehicle in front. In the automatic follow-up control in the present embodiment, a follow-up cruise control (inter-vehicle distance control) for controlling the subject vehicle 1 to follow a traveling vehicle in front, a follow-up stop control for controlling the subject vehicle 1 to stop as a vehicle in front stops during the follow-up cruise control, and a stop maintaining control for maintaining the stopped state of the subject vehicle 1 that has stopped as a result of the follow-up stop control are mainly set. The cruise control unit executes the automatic follow-up control by selectively using these controls.

More specifically, if a vehicle in front is not estimated to be in a substantially stopped state but is determined to be in a traveling state, the cruise control unit 5 executes the follow-up cruise control. Specifically, the cruise control unit 5 sets a target inter-vehicle distance Lt depending on the speed Vf of the vehicle in front, and sets a target deceleration at for achieving the target inter-vehicle distance Lt. Then, the cruise control unit 5 outputs a control signal according to the target deceleration at as appropriate to the throttle valve controller 15 and the automatic brake controller 17 to bring the inter-vehicle distance L to the target inter-vehicle distance Lt. For example, the cruise control unit 5 has a map set and stored therein in advance for setting the target inter-vehicle distance Lt with any of the characteristics "long" "medium" and "short" in relationship to the speed Vf of the vehicle in front, as shown in FIG. 9. The cruise control unit 5 sets the target inter-vehicle distance Lt based on one of the characteristics selected through an operational input to the constant speed cruise switch 13 by a driver or the like.

On the other hand, if the speed Vf of the vehicle in front has lowered to a speed that is estimated to be in a substantially stopped state during the follow-up cruise control, the cruise control unit 5 executes the follow-up stop control. Specifically, when the follow-up stop control is started, the cruise control unit 5 sets a first area Ar1 immediately behind the vehicle in front (an area of 3 m, for example, behind the vehicle in front) and sets a second area Ar2 behind the first area Ar1 (an area of 2 m, for example, behind the first area Ar1), for example, as shown in FIG. 10. Then, if the subject vehicle 1 is traveling in an area Ar3 that is further behind the second area Ar2, the cruise control unit 5 calculates a deceleration G3 for stopping the subject vehicle 1 at a position of Dstop (3 m, for example) behind the vehicle in front, and outputs a control signal corresponding to the deceleration G3 to the automatic brake controller 17. If the subject vehicle 1 is traveling in the second area Ar2, the cruise control unit 5 sets a constant deceleration KG2 only if the subject vehicle 1 is traveling at a speed lower than a creep speed Vc (7 km/h, for example) at which the subject vehicle 1 creeps, and outputs a control signal corresponding to the deceleration KG2 to the automatic brake controller 17. If the subject vehicle is traveling in the first region Ar1, the cruise control unit 5 sets a constant deceleration KG1 that is higher than the deceleration KG2 only if the subject vehicle 1 is traveling at a speed lower than the creep speed Vc, and outputs a control signal corresponding to the deceleration KG1 to the automatic brake controller 17.

When the subject vehicle 1 stops as a result of the follow-up stop control, the cruise control unit 5 executes the stop maintaining control. When the stop maintaining control is started, the cruise control unit 5 outputs a control signal to generate a brake force required for maintaining the stopped state of the subject vehicle 1 to the automatic brake controller 17.

In the stop maintaining control, the cruise control unit 5 switches the control under the automatic cruise control to the follow-up cruise control basically on the condition that a predetermined operational input is made by the driver, and maintains the stopped state of the subject vehicle 1 by the follow-up cruise control. Then, if it is determined that the inter-vehicle distance L to the vehicle in front has become longer than a determination threshold Dth before a preset amount of time Tth0 (Tth0=3 seconds, for example) has passed since the operational input, the cruise control unit 5 permits starting from the stopped state (i.e., permits starting the subject vehicle 1 to follow the vehicle in front).

However, if a time t that has passed since the operational input by the driver is within the preset amount of time Tth0, but the time t is longer than a cancel determination time Tth1 (Tth1=0.7 seconds, for example) for determining whether or not the current time is immediately after the operational input, the cruise control unit 5 maintains the starting permission only when the speed Vf of the vehicle in front is equal to or higher than a predetermined vehicle speed Vth and cancels the starting permission when the speed Vf of the vehicle in front is lower than the vehicle speed Vth.

If the subject vehicle 1 is not started even after the preset preset amount of time Tth0 has passed since the operational input by the driver (i.e., when the starting is not permitted or when the starting is cancelled though it is permitted), the cruise control unit 5 automatically switches the control under the automatic cruise control from the follow-up cruise control to the stop maintaining control.

The cruise control unit 5 is configured to variably set the determination threshold Dth based on the relationship with the vehicle in front in the stopped state or the like. Specifically, the cruise control unit 5 calculates a first threshold Dth1 that is updated according to a change in the inter-vehicle distance L to the vehicle in front in the stopped state when the inter-vehicle distance L changes to a larger value and a second threshold Dth2 that is changed to a larger value as the speed of the vehicle in front increases. Then, the cruise control unit 5 sets the determination threshold Dth based on the larger of the first threshold Dth1 and the second threshold Dth2.

In this manner, the cruise control unit 5 implements the functions of an automatic follow-up controller, a starting permission determiner, a threshold setter and a canceller in the present embodiment.

Next, determination of permissibility of follow-up starting performed by the cruise control unit 5 during the stop maintaining control will be described according to the flowchart of a routine for determining permissibility of follow-up starting shown in FIG. 2.

This routine is repeated for every preset time since the control under the automatic cruise control is switched to the stop maintaining control until the subject vehicle 1 is started. When the routine is started, the cruise control unit 5 first checks whether or not an operational is input in step S101 by the driver indicating the intention to permit follow-up starting. In the present embodiment, the operational input indicating the driver's intention may be a predetermined operation of the constant speed cruise switch 13, or depression of an accelerator pedal (not shown) at a predetermined depression amount, for example.

Next, if it is determined that an operational input by the driver is detected in step S101, the cruise control unit 5 proceeds to step S102 where it switches the control under the automatic cruise control from the stop maintaining control to the follow-up cruise control while maintaining the stopped state of the subject vehicle 1 and sets a flag Fst indicating permission of follow-up starting to "1." Then, the cruise control unit 5 proceeds to step S103.

On the other hand, if it is determined that no operational input by the driver is detected in step S101, the cruise control unit 5 proceeds to step S103.

In step S103 after step S101 or step S102, the cruise control unit 5 sets the determination threshold Dth for determining the permissibility of follow-up starting based on the inter-vehicle distance L to the vehicle in front.

The determination threshold Dth is set according to the flowchart of a sub-routine for setting a determination threshold shown in FIG. 3, for example. The cruise control unit first calculates the first threshold Dth1 by processes of steps S201 to S207. Specifically, when the sub-routine is started, the cruise control unit 5 first checks whether or not the current time is immediately after the subject vehicle 1 is stopped by the follow-up stop control in step S201.

Then, if it is determined that the current time is immediately after the subject vehicle 1 is stopped by the follow-up stop control in step S201, the cruise control unit 5 proceeds to step S202 where it calculates a value obtained by adding a preset distance K to the current (immediately after the follow-up stopping) inter-vehicle distance L as an initial value of the first threshold Dth1 variably set based on the inter-vehicle distance L to the vehicle in front.

On the other hand, if it is determined that the current time is not immediately after the subject vehicle 1 is stopped by the follow-up stop control in step S201, the cruise control unit 5 proceeds to step S203.

In step S203 after step S201 or step S202, the cruise control unit 5 checks whether or not the vehicle in front is currently in a stopped state based on the speed Vf of the vehicle in front, for example.

Then, if it is determined that the vehicle in front is not in the stopped state (i.e., if it is determined that the vehicle in front is traveling) in step S203, the cruise control unit 5 proceeds to step S208.

On the other hand, if it is determined that the vehicle in front is in the stopped state in step S203, the cruise control unit 5 proceeds to step S204 where it checks whether or not the current inter-vehicle distance L is changed to be longer than the inter-vehicle distance that is a basis of the currently calculated first threshold Dth1.

Then, the cruise control unit 5 proceeds to step S205 if it is determined that the current inter-vehicle distance L is changed to be longer in step S204, while it proceeds to step S208 if it is determined that the current inter-vehicle distance L is not changed to be longer in step S204. A case where the inter-vehicle distance L is changed to be longer may be a case where, during the stop maintaining control executed due to a traffic congestion or the like, the vehicle in front moves forward for a very short distance and stops again, for example.

In step S205 after step S204, the cruise control unit 5 updates the first threshold Dth1 based on the current inter-vehicle distance L, and then proceeds to step S206. Specifically, in step S205, the cruise control unit 5 sets a distance obtained by adding the predetermined distance K to the current inter-vehicle distance L as an updated first threshold Dth1, and then proceeds to step S206.

In step S206, the cruise control unit 5 checks whether or not the first threshold Dth1 updated in step S205 is larger than a preset upper limit Dmax (Dmax=7 m, for example).

If it is determined that the first threshold Dth1 is equal to or shorter than the upper limit Dmax in step S206, the cruise control unit 5 maintains the first threshold Dth1 as updated and proceeds to step S208.

On the other hand, if it is determined that the first threshold Dth1 is larger than the upper limit Dmax in step S206, the cruise control unit 5 changes (limits) the first threshold Dth1 to the upper limit Dmax, and then proceeds to step S208.

After proceeding to step S208 from step S203, step S204, step S206 or step S207, the cruise control unit 5 calculates the second threshold Dth2 by processes of step S208 and step S209. Specifically, in step S208, the cruise control unit 5 estimates the gradient of the road on which the subject vehicle 1 is currently in the stopped state based on the longitudinal acceleration ao detected by the longitudinal acceleration sensor 12, for example, and estimates the acceleration ac of the subject vehicle 1, which may be generated by a creep torque when the stop maintaining control of the subject vehicle 1 is terminated, based on the gradient of the road.

In step S209, the cruise control unit 5 calculates the second threshold Dth2 based on the speed Vf of the vehicle in front and the acceleration ac. The second threshold Dth2 is basically calculated in a variable manner within a range with an upper limit of 7 m, for example, and is changed to a larger value as the speed Vf of the vehicle in front becomes higher. In addition, the second threshold Dth2 is changed to a larger value as the gradient (both in an up grade and a down grade) of the road is larger with respect to a flat road. Accordingly, the second threshold Dth2 can be corrected to a distance allowing a backward movement or the like of the vehicle in front for an up grade and can be corrected to a safer value as the acceleration ac of the subject vehicle 1 increases for a down grade. Specifically, the cruise control unit 5 has stored therein a three-dimensional map using the speed Vf of the vehicle in front and the acceleration ac (the gradient of the road) caused by a creep torque as parameters, for example, as shown in FIG. 4 and calculates the second threshold Dth2 by referring to the map.

In step S210 after step S209, the cruise control unit 5 sets the larger of the first threshold Dth1 and the second threshold Dth2 as the determination threshold Dth, and then exits the sub-routine.

In step S104 after step S103 in the main routine of FIG. 2, the cruise control unit 5 checks whether or not the flag Fst indicating permission of follow-up starting is set to "1."

If it is determined that the flag Fst is reset to "0" in step S104, the cruise control unit 5 exits the routine without any change.

On the other hand, if it is determined that the flag Fst is set to "1" in step S104, the cruise control unit 5 proceeds to step S105, where it checks whether the time that has passed since the operational input by the driver is detected (i.e., the time that has passed since the flag Fst is set to "1") is equal to or shorter than the preset amount of time Tth0 (Tth0=3 seconds, for example).

If it is determined that the time t that has passed is longer than the preset amount of time Tth in step S105, the cruise control unit 105 proceeds to step S106, where the cruise control unit 105 switches the control under the automatic cruise control from the follow-up cruise control to the stop maintaining control and resets the flag Fst to "0," and then exits the routine.

On the other hand, if it is determined that the time t that has passed is equal to or shorter than the preset amount of time Tth0 in step S105, the cruise control unit 5 proceeds to step S107, where it checks whether the current inter-vehicle distance L is equal to or longer than the determination threshold Dth.

If it is determined that the inter-vehicle distance L to the vehicle in front is shorter than the determination threshold Dth in step S107, the cruise control unit 5 exits the routine without any change.

On the other hand, if it is determined that the inter-vehicle distance L to the vehicle in front is equal to or longer than the determination threshold Dth in step S107, the cruise control unit 5 proceeds to step S108, where it determines the permissibility of starting the subject vehicle 1, and then proceeds to step S109.

After proceeding to step S109, the cruise control unit 5 determines whether to cancel the starting permission of step S108 by processes of step S109 and S110. Specifically, the cruise control unit 5 first checks whether or not the time t that has passed since the operational input by the driver is detected is equal to or shorter than the cancel determination time Tth1 in step S109. The cancel determination time Tth1 is set to a time that is shorter than Tth0 and short enough to recognize that it is immediately after the operational input by the driver. Specifically, the cancel determination time Tth1 is set to 0.7 seconds, for example.

If it is determined that the time t that has passed from the operational input is equal to or shorter than the cancel determination time Tth1 and that the determination of the starting permission is made immediately after the operational input by the driver in step S109, the cruise control unit 5 proceeds to step S112 while maintaining the determination of the starting permission.

On the other hand, if it is determined that the time t that has passed from the operational input is longer than the cancel determination time Tth1 in step S109, the cruise control unit 5 proceeds to step S110, where it checks whether or not the speed Vf of the vehicle in front is equal to or higher than the set vehicle speed Vth. The set vehicle speed Vth is set to such a speed based on which it is possible to determine that the vehicle in front is traveling (i.e., that the vehicle in front is not in the stopped state or in a substantially stopped state). Specifically, the set vehicle speed Vth is set to 1 km/h, for example.

If it is determined that the speed Vf of the vehicle in front is lower than the set vehicle speed Vth and thus the vehicle in front is in the stopped state in step S110, the cruise control unit 5 proceeds to step S111, where it cancels the determination of the starting permission set in step S108, and then exits the routine.

On the other hand, in step S112 after step S109 or step S110, the cruise control unit 5 resets the flag Fst to "0," and in the next step S113, the cruise control unit 5 starts the subject vehicle 1 from the stopped state and then terminates the routine.

Next, a change of a first threshold D1 set in the present embodiment as described above will be described. For example, if the subject vehicle 1 is stopped with an inter-vehicle distance L to a vehicle in front as shown in FIG. 5A, the first threshold D1 is set based on the inter-vehicle distance L.

In the relationship between the subject vehicle 1 and the vehicle in front, if a pedestrian or the like passes between the subject vehicle 1 and the vehicle in front as shown in FIG. 5B, the apparent inter-vehicle distance L may be temporarily shorter due to the presence of the pedestrian. In such case, the first threshold D1 is not updated based on the current inter-vehicle distance L and the first threshold D1 is maintained without any change. In such case, the apparent speed Vf of the vehicle in front becomes higher as a result of the fact that the apparent inter-vehicle distance L changes suddenly between before and after the pedestrian passes. However, since a second threshold D2 is set to a very short distance, the determination threshold Dth is basically set based on the first threshold D1. Therefore, an event that the determination threshold Dth becomes extremely short or the like is prevented even when a pedestrian or the like passes, and the control is properly prevented from being switched from the stop maintaining control to the follow-up cruise control at a timing not intended by the driver.

On the other hand, if the inter-vehicle distance L changes to a larger value as a result that the vehicle in front has moved for a very short distance and stopped again as shown in FIG. 5C, the first threshold D1 is updated to a larger value with an upper limit Dmax. As a result, the first threshold D1 is updated so that the predetermined distance K is ensured for the inter-vehicle distance L to the vehicle in front in the stopped state until the first threshold D1 reaches the upper limit Dmax.

Next, the determination of the starting permission performed in the present embodiment will be described, taking a case where the determination threshold Dth is equal to Dmax as an example. If the inter-vehicle distance L is sufficiently shorter than the determination threshold Dth, for example, as shown in FIG. 6A in the case that the time t that has passed since an operational input is made by the driver is within the preset amount of time Tth0, the determination of the starting permissibility is not performed and the stopped state of the subject vehicle 1 is maintained whether the vehicle in front is traveling or in the stopped state.

If the vehicle in front is in the stopped state with the inter-vehicle distance L slightly shorter than the determination threshold Dth, for example, as shown in FIG. 6B in the case that the time t that has passed since the operational input is made by the driver is within the preset amount of time Tth0, the determination of the starting permission is not basically performed and the stopped state of the subject vehicle 1 is maintained. However, there may be a case where the inter-vehicle distance L becomes temporarily longer than the determination threshold Dth due to detection errors of the inter-vehicle distance L or the like, for example. In such case, the starting permission is maintained only when this event occurs before the cancel determination time Tth1 passes from the operational input (as shown in FIG. 7A, for example), and the starting permission is cancelled when this event occurs after the cancel determination time Tth1 has passed (as shown in FIG. 7B, for example). Accordingly, if the starting permission is determined due to detection errors or the like of the inter-vehicle distance L, only the starting permission that is determined at a timing that does not cause any uncomfortable feeling to the driver is maintained. Thus, if the inter-vehicle distance L is slightly shorter than the determination threshold Dth in the first place, a situation where the driver makes an operational input intending to shorten the inter-vehicle distance L to the vehicle in front in the stopped state can be assumed. In such case, starting of the subject vehicle 1 from the stopped state immediately after the operational input substantially in conjunction therewith is as intended by the driver, and thus produces no particular problem. On the other hand, there may be a case where the subject vehicle 1 is not started immediately after an operational input by the driver but is started after a certain period of time though the driver made the operational input intending to shorten the inter-vehicle distance L to the vehicle in front in the stopped state. Particularly in this case where the vehicle in front is in the stopped state, the driver cannot associate his/her operational input with the starting of the subject vehicle 1 and may feel uncomfortable. Accordingly, by canceling the determination of the starting permission only in such cases, it is possible to prevent the subject vehicle 1 from being started at an unintended timing and reduce the uncomfortable feeling of the driver.

If the inter-vehicle distance L becomes longer than the determination threshold Dth0, for example, as shown in FIG. 6B when the time t that has passed since the operational input is made by the driver is within the preset amount of time Tth0, the determination of the starting permission is made and the subject vehicle 1 is started from the stopped state whether the vehicle in front is traveling or in the stopped state.

The relationships described above can be summarized as shown in FIG. 8, for example.

While an example in which the stereo camera 3 is used to detect a vehicle in front has been described in the embodiment presented above, the present invention is not limited thereto and a vehicle in front may be detected using a millimeter wave radar, an infrared laser radar, or the like.

What is claimed is:

1. A driving support apparatus for a vehicle, comprising:
   a front vehicle detector configured to detect a vehicle in front on a subject vehicle travel path;
   an automatic follow-up controller capable of selectively executing as an automatic follow-up control, when the vehicle in front is detected, any of controls including a follow-up cruise control controlling the subject vehicle to follow the vehicle in front that is traveling, a follow-up stop control controlling the subject vehicle to stop as the vehicle in front that stops during the follow-up cruise control, and a stop maintaining control maintaining a stopped state of the subject vehicle that has stopped as a result of the follow-up stop control;
   a starting permission determiner configured to permit starting of the subject vehicle from a stopped state when a preset operational input is made by a driver during the stop maintaining control and an inter-vehicle distance to the vehicle in front exceeds a determination threshold before a preset amount of time passes from the operational input; and
   a threshold setter configured to calculate a first threshold that is updated to a larger value according to a change in the inter-vehicle distance to the vehicle in front in a stopped state when the inter-vehicle distance changes to a larger value and a second threshold that is changed to a larger value as a speed of the vehicle in front increases, and to variably set the determination threshold based on the larger of the first threshold and the second threshold.

2. The driving support apparatus for a vehicle according to claim 1, wherein the threshold setter is configured to limit the updating of the first threshold to a larger value up to a preset upper limit or lower.

3. The driving support apparatus for a vehicle according to claim 1, wherein the threshold setter is configured to change the second threshold to a larger value as a road gradient is larger.

4. A driving support apparatus for a vehicle, comprising:
   a front vehicle detector configured to detect a vehicle in front on a subject vehicle travel path;
   an automatic follow-up controller capable of selectively executing as an automatic follow-up control, when the vehicle in front is detected, any of controls including a follow-up cruise control controlling the subject vehicle to follow the vehicle in front that is traveling, a follow-up stop control controlling the subject vehicle to stop as the vehicle in front that stops during the follow-up cruise control, and a stop maintaining control maintaining a stopped state of the subject vehicle that has stopped as a result of the follow-up stop control;
   a starting permission determiner configured to determine starting permission of the subject vehicle from a stopped state when a preset operational input is made by a driver during the stop maintaining control and an inter-vehicle distance to the vehicle in front exceeds a determination threshold before a preset amount of time passes from the operational input; and
   a canceller configured to cancel a the starting permission previously granted by the starting permission determiner if a time that has passed from the operational input is determined to be shorter than the preset amount of time and longer than a cancel determination time for determining whether it is immediately after the operational input by the driver and if the vehicle in front is determined to be in a stopped state or in a substantially stopped state at a speed lower than a preset vehicle speed.

* * * * *